Oct. 14, 1952 L. YUTANG 2,613,794
VISUAL SELECTING DEVICE FOR CHINESE TYPEWRITERS AND THE LIKE
Filed March 3, 1948 3 Sheets-Sheet 1

INVENTOR.
LIN YUTANG
BY
his ATTORNEYS.

Oct. 14, 1952        L. YUTANG        2,613,794
VISUAL SELECTING DEVICE FOR CHINESE TYPEWRITERS AND THE LIKE

Filed March 3, 1948        3 Sheets-Sheet 2

INVENTOR.
LIN YUTANG

BY Campbell, Brumbaugh & Free his ATTORNEYS.

Oct. 14, 1952     L. YUTANG     2,613,794
VISUAL SELECTING DEVICE FOR CHINESE TYPEWRITERS AND THE LIKE
Filed March 3, 1948     3 Sheets-Sheet 3

INVENTOR.
LIN YUTANG
BY
Campbell, Brumbaugh & Free
his ATTORNEYS.

Patented Oct. 14, 1952

2,613,794

UNITED STATES PATENT OFFICE 2,613,794

VISUAL SELECTING DEVICE FOR CHINESE TYPEWRITERS AND THE LIKE

Lin Yutang, New York, N. Y., assignor to Mergenthaler Linotype Company, Brooklyn, N. Y., a corporation of New York Application March 3, 1948, Serial No. 12,754

6 Claims. (Cl. 197—1)

This invention relates to improvements in devices for visually selecting symbols, Chinese or other oriental characters, components of such characters and the like to type, print or otherwise reproduce them. More particularly, the invention relates to an improved form of visual selector for Chinese typewriters, photo-composing machines, Teletypes, type casting and type-setting devices of the kind disclosed in my copending application Serial No. 662,722, filed April 17, 1946.

The typewriter embodying one form of the invention disclosed in my copending application Serial No. 662,722, is based on a novel classification of Chinese characters and components and includes a novel system for selecting and typing any one of many thousands of symbols, characters or components thereof by means of a keyboard having a relatively small number of keys.

Generally, the keyboard includes a first group of keys, each having a symbol thereon corresponding to the upper left-hand portion or top of a group of characters or components thereof. The keyboard also includes a second group of keys each having a symbol thereon corresponding to the lower right-hand corner or bottom of a group of the characters or components. By pressing a key having a symbol thereon corresponding to the top of the desired character or component, a preliminary selection is made of all characters and components having the selected top configuration. When a second key having a symbol thereon corresponding to a bottom configuration is pressed, a further selection is made from the first selected group so that all of the characters or components having the same top and bottom are selected. This last group will include the character or component to be typed or otherwise reproduced. The keyboard includes a third group of keys each of which corresponds to the position of a different member of the selected group. These keys may be depressed to select and print different members of the group.

Inasmuch as the written Chinese language has many thousands of characters and their components, I have provided a novel form of typecarrying member or drum. This drum includes a rotary member made up of a pair of rotary end plates between which are mounted, also for rotation, a plurality of groups of type bars. Each group of type bars, usually six in number, is mounted in rotatable end plates so that any bar can be moved selectively to the outside of the drum. Each of the bars is of polygonal cross-section having a row of types extending lengthwise of each of its faces. The types on adjacent faces are aligned around the type bars to provide rows of types around the bars. All of the types in one row around a bar have the same tops and bottoms and form a group from which a visual selection can be made.

In a typing operation, the pressing of a "tops" key causes the drum to be rotated by means of a motor and to stop with one of the bars having the character or component thereon corresponding to the symbol on the "tops" key adjacent to a paper carriage. The act of depressing a "bottoms" key causes the paper carriage to move relative to the selected bar to position the paper thereon adjacent to a row of types around the bar all having the same top and bottom configuration.

By pressing one of the third group of keys, the selected bar is rotated to bring the selected component or character adjacent to the paper for printing thereon.

The operation of the third group of keys is dependent upon visual selection of the desired character or component, that is, a mechanism is provided for displaying the selected group, and any member of the group can be selected by pressing a corresponding numbered key.

In my earlier selecting mechanism, a group of characters or components corresponding to the types in a row around a bar is printed on a separate card or slide member, and a sufficient number of cards to display all the different groups are arranged in the machine above the keyboard, with the printed characters and components thereon covered by adjacent cards. When a "top" or a "top" and a "bottom" key are depressed, the card bearing the group of characters and components having the corresponding top or top and bottom is projected into view to permit the final selection to be made.

Inasmuch as many cards are required to display all of the various groups of characters, the cards and the characters and components thereon must be small because of space limitations. As a result, they are difficult to see, even with magnifiers. Moreover, complex mechanism is required to project the cards into view. Also, the cards cannot be disposed in a single vertical plane thereby making it necessary to scan the top of the machine to locate the projected card.

The present invention constitutes an improvement over the above-described visual selecting system whereby a less complicated mechanism is provided and each selected group of characters is displayed more clearly at a fixed location on the machine, thereby facilitating selection of the desired character or component from the group.

In accordance with the present invention, I have provided a second or auxiliary drum corresponding generally to the type-carrying drum described above and have interconnected these drums in such a way as to cause the auxiliary drum to follow the movements of the type-carrying drum and the paper carriage. The auxiliary drum is provided with printed characters and/or components corresponding to the characters and/or components on the type-carrying drum, so that the auxiliary drum is moved to expose at the front of the machine, the group of characters and/or components corresponding to the row of types in position to print on the paper. Inasmuch as the auxiliary drum moves with both the type-carrying drum and the carriage, only that group of characters and/or components on the auxiliary drum corresponding to the row of types around a type bar that is in position to print is exposed at any one time. By providing a suitable magnifying or projection system, the printed matter on the auxiliary drum may be shown enlarged for ready and easy viewing.

The new visual selecting system has the advantages of being considerably less complicated than my prior system, the characters or components are more easily seen and they are displayed at a fixed zone in the machine so that it is unnecessary to search along the front of the machine to find them.

For a better understanding of the present invention, reference may be had to the accompanying drawings, in which.

Figure 1:
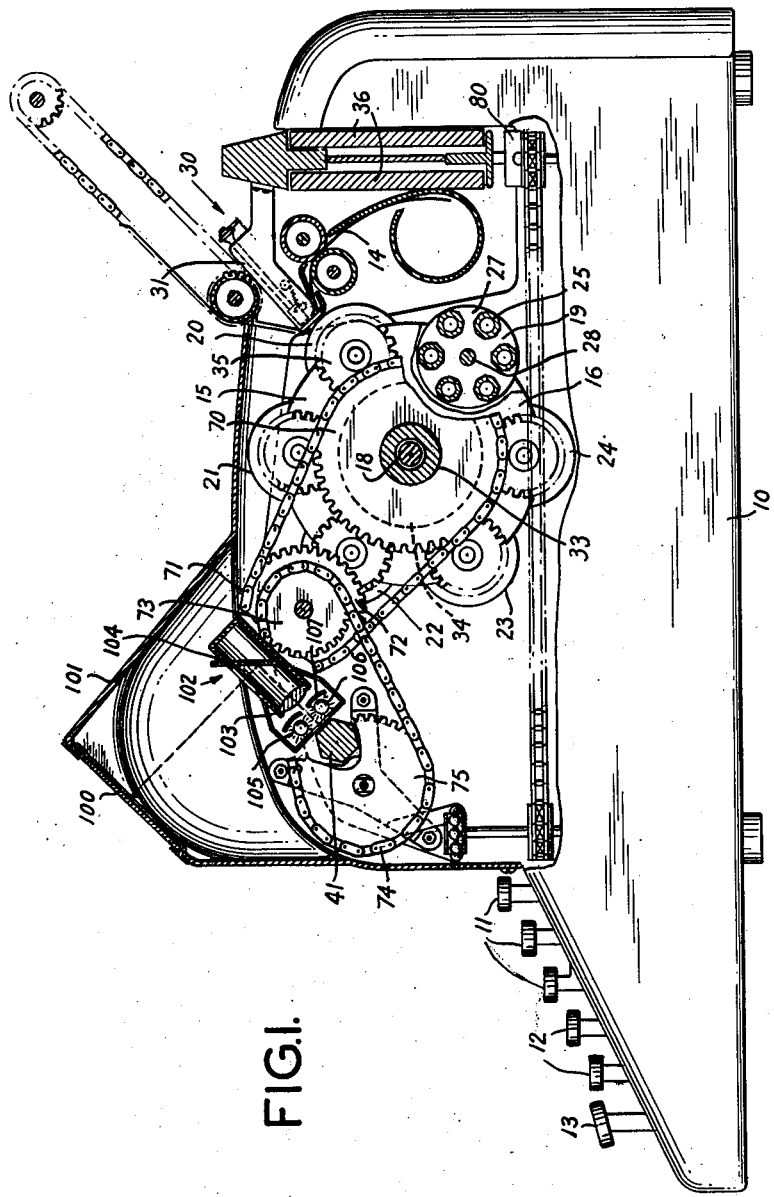
Fig. 1 is a view in side elevation of a typewriter embodying the present invention, the casing of the typewriter being broken away to disclose details of construction.

While the invention is applicable to many types of machines or devices for printing, typing, for the telegraphic or radio transmission of printed material, and for the setting or casting of type, it will be explained herein with reference to its use in connection with a typewriter of the kind disclosed in my copending application Serial No 662,722. This typewriter, as shown in Fig. 1, is provided with a casing 10 which houses the operating mechanism of the device and has a keyboard in its front including groups of keys 11, 12 and 13 arranged in rows across the keyboard. The group of keys 11 are utilized to select a group of characters or components of characters, for example, of the Chinese language all of which have the same top configuration. The second group of keys 12 is used to select characters or components having the same bottom configuration.

The row of keys 13 is utilized for making a selection of one of a group of characters having the same top configuration or top and bottom configuration, but which are otherwise different and for the printing of the characters on a sheet of paper 14 at the rear of the machine.

Figure 5:
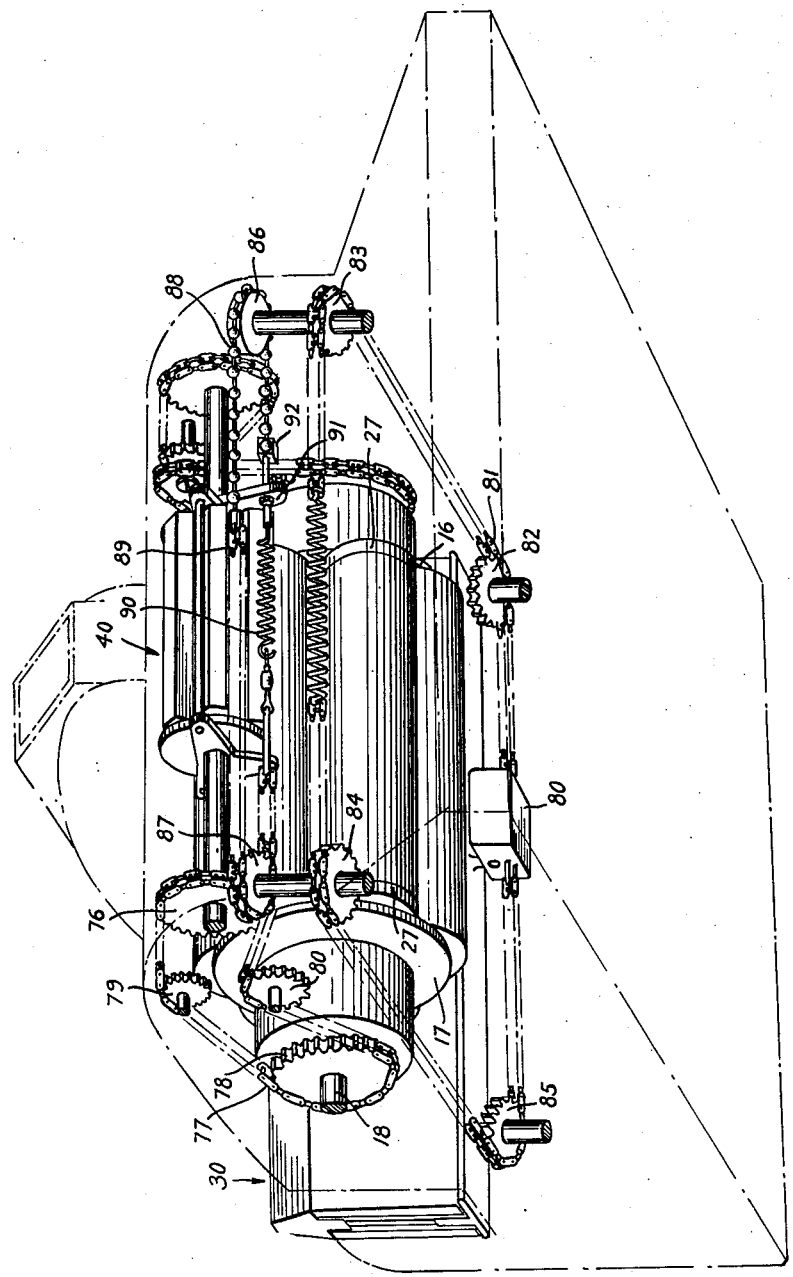
Fig. 5 is a perspective view of the selector mechanism looking upwardly from beneath the mechanism, only those details of the mechanism being shown which relate to the selecting mechanism.

As best shown in Figs. 1 and 5, the device or drum 15 which carries the various types for printing the characters or components includes a pair of disc-like end plates 16 and 17. The end plates 16 and 17 are mounted on a shaft 18 which extends transversely of the typewriter casing and is supported in a suitable frame, not shown, so that the end plates 16 and 17 can be rotated together by means of the shaft 18. Between the end plates 16 and 17 are mounted a plurality of groups, in this case, six groups 19, 20, 21, 22, 23 and 24 of type bars. Each group of type bars, as best shown in Fig. 1, is made up of six octagonal bars 25 which are rotatably mounted in disc-like end plates 26 and 27 which are connected to a shaft 28 rotatably mounted in the end plates 16 and 17. Thus, the end plates 16 and 17 can be rotated by means of the shaft 18 to bring any of the groups 19 to 24 of type bars adjacent to the paper carriage 30, and these groups of type bars can be rotated to bring any of the individual bars 25 adjacent to the printing hammer 31 which is mounted on the paper carriage behind the sheet of paper 14.

Each of the type bars 25 is provided on each of its faces with a row of symbols, characters or components of characters to be typed or printed on the paper 14. In order to accomplish these operations and to bring a selected type bar 25 into position, mechanism, not shown, is provided for rotating the shaft 18 through a predetermined angle in response to operation of one of the keys 11. Further, a selected type bar is brought into position by this same operation through the medium of a sleeve 33 which is rotatably mounted on the shaft 18 and is provided with a gear 34 which meshes with smaller gears 35 on the end of each shaft 28. Rotation of the sleeve 33 indexes all of the groups of type bars 25 and presents adjacent to the paper carriage and the printing hammer 31 a type bar having thereon all of the characters or components of characters or other symbols having the same top configuration as that displayed on the depressed key of the group of keys 11. The rows of types along the faces of the type bars 25 are also classified in accordance with their bottom configuration. Therefore, to present all of the types having the same top and bottom configuration adjacent to the paper carriage 30, one of the keys having a selected bottom configuration symbol thereon may be depressed. As a result of this action, the paper carriage 30 is moved bodily in the guides 36 to bring the hammer 31 directly in front of the type member along the length of a type bar 25 having the same top and bottom configurations as those selected by the depressing of a key 11 and a key 12.

The types having the same top and bottom configuration are arranged in rows extending around the type bars 25. Therefore, one type bar can have in one row extending around it, eight different characters having one and the same top and bottom configurations. Ordinarily, the eight spaces provided around the type bar are more than enough to receive all of the types having one and the same top and bottom configurations. However, if enough spaces are not provided, the extra types can be disposed in an adjacent row or some other row.

The printing hammer 31 is of such size that it will, upon striking the paper, make an impression of only the one type which is in direct alignment with it so that only this type will be impressed or printed upon the paper 14.

Figure 2:
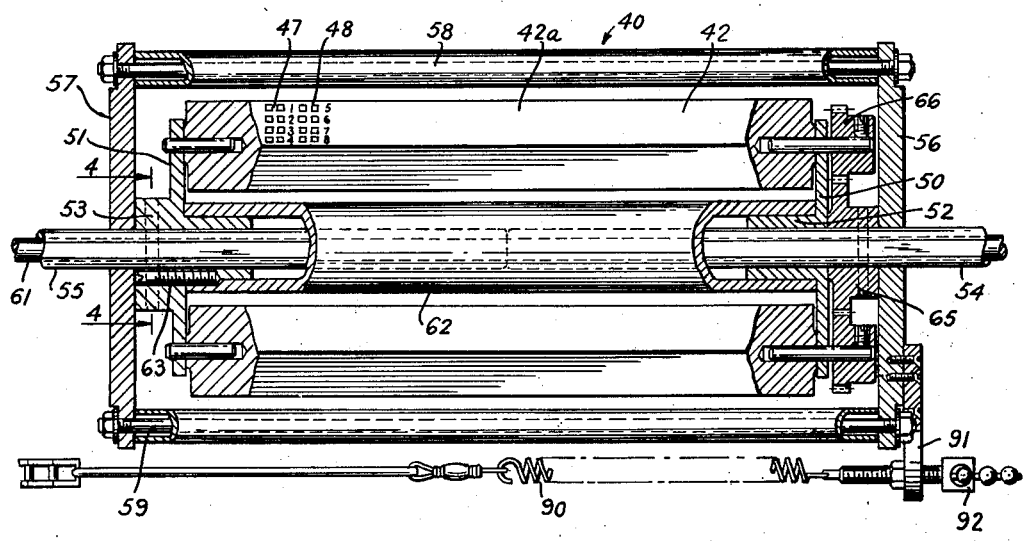
Fig. 2 is a view in front elevation of a portion of the selector mechanism, parts of this mechanism being broken away to disclose details thereof.
Figure 3:
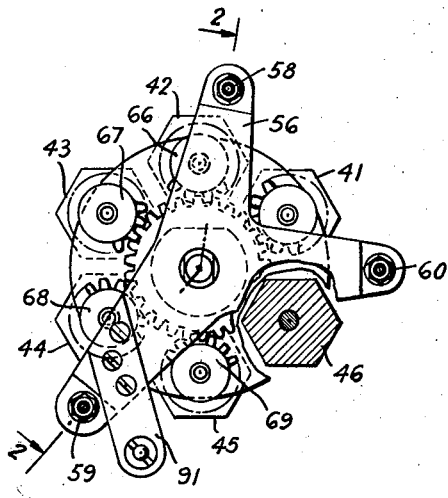
Fig. 3 is a view in end elevation of the device shown in Fig. 2 with parts broken away to disclose details of construction.
Figure 4:
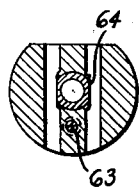
Fig. 4 is a view in section taken on line 4—4 of Fig. 2.

The present invention relates to a mechanism for facilitating the selection of one of the group of types extending in a row around a type bar 25 so that the final selection of the character or component to be printed is made as the result of a visual inspection. The printing or other operation is produced by depressing one of the group of keys 13 which corresponds in position to the character to be selected from the group of eight, more or less, around the type bar. The visual selecting mechanism includes an auxiliary drum member 40 which is best shown in Figs. 2 and 3. This auxiliary drum member consists of six bars 41, 42, 43, 44, 45 and 46, each having, as illustrated, six faces. Each of the hexagonal bars 41 to 46 corresponds to a different one of the groups 19 to 24 of type bars. Each of the faces of the bars 41 to 46 corresponds to the entire periphery of a different one of the type bars 25 and is provided on its face with indicia, symbols, characters or components thereof corresponding to the types extending around the corresponding type bar 23. Thus, as shown in Fig. 2, one face 42a of the type bar 42 is provided with a plurality of groups 47, 48, etc. of printed characters and components. As shown, these groups may consist of eight or less characters, each group corresponding to a different row of types around one type bar 25.

The bars 41 to 46 are rotatably mounted in disc-like end plates 50 and 51 which are mounted on hubs 52 and 53 which in turn are supported slidably on a pair of sleeve shafts 54 and 55. The sleeve shafts 54 and 55 are rotatably mounted in Y-shaped end plates 56 and 57 which are connected by cross rods and spacers 58, 59 and 60 to hold the assembly rigid. The sleeve shafts 54 and 55 are rotatably mounted on a rod or shaft 61, fixed in the framework of the typewriter so that the sleeves 54 and 55 can rotate relative to the shaft and the entire mechanism 40 can slide axially of the shafts 54 and 55.

As shown in Fig. 2, the hub member 53 is keyed by means of a machine screw to a tubular spacing sleeve 62 extending between the end plates 50 and 51 and the sleeve 55 is further slidably and non-rotatably connected to the hub 53 by means of flats 64, as shown thereon.

The hub 52 is rotatably and slidably mounted on the sleeve shaft 54. This shaft also carries a gear 65 which is slidable but non-rotatable with respect to the shaft 54 and engages continuously with the small pinions 66, 67, 68, 69, etc. which are connected to the various bars 41 to 46. Thus, upon rotation of the sleeve shaft 54, all of the bars 41 to 46 are rotated about their axes. Upon rotation of the sleeve shaft 55, the entire drum assembly, including the end plates 50, 51 and the bars 41 to 46 mounted therein, is rotated bodily relative to the Y-shaped end plates 56 and 57. The above-described indicator is constructed and arranged and is driven in such a way as to duplicate the movements of the type-carrying drum 15 and also the movement of the paper carriage so that the various groups of characters 47, 48, etc. displayed on the various bars may be brought into view to permit the selection of a desired character or component to be typed or printed, as described above. These motions are produced by connecting the indicating device 40 to the paper carriage 30 and to the type-carrying drum 15, as described hereinafter. Referring now to Fig. 1 of the drawings, the sleeve shaft 33 which rotates the groups 19 to 24 of type bars 25 is provided with a sprocket 70 which is connected by means of a chain 71 to a smaller idler sprocket 72. A still smaller idler sprocket 73 is connected to the sprocket 71 and by means of a chain 74 to a larger sprocket 75 which is fixed to the sleeve shaft 54. Thus, upon rotation of the sleeve shaft 33 to rotate all of the groups 19 to 24 of type bars, all of the bars 41 to 46 will be rotated simultaneously through the same angle.

At the outer end of the shaft 55 is a sprocket 76 which is connected by means of a chain 77 to a sprocket 78 fixed to the shaft 18 which is utilized to rotate the entire type drum 15. The chain 77 may be passed over suitable idler sprockets 79 and 80 to clear other elements of the typewriter. Thus, upon rotation of the type drum 15 bodily, the end plates 50 and 51 and the indicating bars 41 to 46 are rotated bodily. In this way, the individual bars 41 to 46 follow exactly the movements of the groups of type bars 19 to 24.

In order to present the various groups of characters, symbols or components at a central location or viewing window in the front of the typewriter, it is necessary to move the indicating device 40 bodily relative to this viewing window to correspond to the movement of the carriage 30. This may be accomplished by providing a downwardly extending member 80 on the bottom of the carriage and connecting this member by means of a chain 81 or other equivalent mechanism to the indicator 40 so that as the carriage moves in one direction, the indicator 40 will move bodily in the opposite direction. As best shown in Fig. 5, the chain 81 is supported on four idler sprockets 82, 83, 84 and 85 disposed in the lower part of the typewriter casing. The sprockets 83 and 84 drive a pulley 86 and a sprocket 87 over which pass respectively a ball chain 88 having one end connected to a chain 89 which passes around the sprocket 87. One end of the chain 89 is connected by means of a spring and take up member 90 to an arm 91 which extends downwardly from the end frame member 56, as shown in Figs. 3 and 5. One end of the ball chain 88 is also connected by means of a suitable coupling 92 to the arm 91. Therefore, as the carriage 30 moves back and forth, the indicating device 40 moves back and forth in the same direction along the sleeve shafts 54 and 55. It will be understood, of course, that the groups of indicia on the indicator 40 will be so arranged that when exposed through the viewing window to be described, they will correspond to the row of characters or components disposed directly in front of the printing hammer on the carriage.

While it would be possible to merely provide an opening and a magnifier in the front of the typewriter casing to permit the indicia on the bars of the mechanism 40 to be viewed, one group at a time, it is preferred to project these indicia onto a ground glass screen 100 and to enlarge them for clarity. Therefore, as shown in Fig. 1, the typewriter may be provided with an upwardly projecting housing 101 in which the ground glass screen 100 is mounted. This housing 101 covers a projection lens system 102 which includes a magnifying lens 103 and a mirror 104. The indicia of a group on the face of a bar 41 are illuminated by means of small electric light bulbs 105 and 106 which are provided with suitable reflectors 107 so that the light directed against and reflected from the face of the bar 40 will be transmitted and magnified by the lens 103 and reflected from the mirror 104 onto the screen 100 where the groups of characters may be seen enlarged and with great clarity. From this group of enlarged characters, it is possible to select one by depressing one of the series of keys 13 which through mechanism described in my copending application Serial No. 662,722 rotates the type bar 25 adjacent the printing hammer to bring the selected character beneath the printing hammer so that a printing operation can take place.

From the preceding description, it will be clear that I have provided a mechanism whereby the final selection of a character can be made easily and with a minimum of eyestrain and loss of time. It will be understood that the device as described is susceptible to considerable modification in the structure of the drive mechanism therefor and that other equivalent drive mechanisms, such as gears and shafts and the like may be utilized for coupling the type-carrying drum and the carriage 30 to the indicating mechanism 40 in order to coordinate their movements. Therefore, the form of the invention disclosed herein should be considered as illustrative and not as limiting the scope of the following claims.

I claim:

1. In an indicating mechanism for typewriters and the like having a rotatable drum mechanism, said mechanism having a plurality of groups of indicia bars having faces each provided with a row of indicia to be reproduced, each bar being rotatable about its axis, and each group of bars being rotatable, and a carriage movable substantially parallel with said bars to align a portion thereof with one of the indicia; the combination of a second drum, a plurality of indicating bars rotatably mounted thereon, each indicating bar corresponding to one of said groups of indicia bars and having a face corresponding to each indicia bar of said group and having symbols thereon corresponding to the indicia on each of said indicia bars, means supporting said second drum for rotary and axial movement, means connecting said drum to said carriage for moving said drum axially in response to movement of said carriage, means connecting said drum to said drum mechanism for simultaneous rotation, and means for rotating the bars of said second drum simultaneously with said groups of bars.

2. An indicating mechanism for typewriters and the like having an indicia carrying mechanism comprising a plurality of groups of bars, said bars being bodily rotatable about a common axis, said groups of bars being rotatable about different axes, and said bars being rotatable about their own axes and having a plurality of faces each provided with a row of indicia, and a carriage movable substantially parallel with said bars; the combination of a pair of coaxial end members, means supporting said end members for rotation about their axis and for axial movement, a plurality of indicating members rotatably mounted in said end members eccentric to the axis of the latter, each indicating member having a plurality of faces equal to the number of bars in one of said groups, indicia on each face corresponding to the indicia in the rows on said bars, means connecting said end members to said carriage for movement of said end members axially in response to movement of said carriage, means connecting said end members to said groups of bars for rotating said end members in response to bodily rotation of said groups, and means connecting said indicating members to said groups of bars for rotating said indicating members in response to movement of said groups about said different axes.

3. An indicating mechanism for typewriters and the like having a first rotary member provided with indicia to be moved selectively to a predetermined position and a carriage movable parallel with the axis of said member for reproduction of a selected indicium in a predetermined position thereon, comprising a rotary indicating member having groups of indicia thereon corresponding to groups of indicia on said first member, a viewing means disposed adjacent to said rotary indicating member for exposing one group of said indicia to view at a time, and means connecting said first rotary member and said carriage to said indicating member to move the latter to expose through said viewing means a group of indicia including the indicium to be reproduced.

4. The indicating mechanism set forth in the preceding claim in which the viewing means comprises a screen and means for projecting on said screen an image of said group of indicia on said indicating member.

5. In a visual selecting mechanism for typewriters and the like having a rotatable drum mechanism provided with a plurality of groups of rotatable bars having rows of symbols extending around said bars, and a carriage movable parallel with said bars for reproduction of said symbols thereon; the combination of a rotatable and axially movable indicating drum having indicating members rotatably mounted thereon, each member corresponding to a different group of said bars, each indicating member having a plurality of faces, and each face corresponding to one of said bars, and having symbols thereon corresponding to the symbols on said bar, means connecting said drum mechanism to said indicating drum and said indicating members to their corresponding groups of bars, for rotating them in unison, and means connecting said carriage to said indicating drum for moving them in unison.

6. In a keyboard controlled typewriter adapted to type hundreds of signs, a typewheel, a stop drum attached to it, a number of satellites rotatably supported by said typewheel, a number of type cylinders rotatably supported by each of said satellites, each type cylinder having types arranged in circumferential and longitudinal rows, a gear carried by each satellite, a sun gear coaxial with said typewheel and meshing with said satellite gears, a satellite stop drum attached to said sun gear, a first group of keys, means actuated by each of said first group of keys arranged to rotate and stop both stop drums to present selectively one of said type cylinders to a row of printing locations, printing means movable along said row, a second group of keys, means arranged to move selectively said printing means to any of said printing locations, to register with said circumferential rows of types, said means linked to and activated by said second group of keys, an indicator wheel, satellite prisms rotatably supported by said indicator wheel, said prisms having faces corresponding to said type cylinders and bearing reproductions of the types on said type cylinders, gears connected to said prisms, an indicator sun gear coaxial with said wheel, and meshing with said latter gears, means to transmit rotating motion between said satellite stop drum and said indicator sun gear, means to transmit rotating motion between said type wheel and said indicator wheel, means to transmit reciprocating motion between said printing means and said indicator wheel, and visualizing means to restrict the reproductions visible to the operator on a face of said prisms to those corresponding to the types on the circumferential row registering with said means for printing on said presented type cylinder.

LIN YUTANG.

REFERENCES CITED

The following references are of record in the file of this patent:

UNITED STATES PATENTS

| Number | Name | Date |
| --- | --- | --- |
| 1,260,753 | Chi | Mar. 26, 1918 |
| 1,443,108 | Walton | Jan. 23, 1923 |